(12) United States Patent
Davis et al.

(10) Patent No.: US 7,620,594 B1
(45) Date of Patent: Nov. 17, 2009

(54) SYSTEMS AND METHODS OF MANAGING PREPAYMENT

(75) Inventors: John D. Davis, San Francisco, CA (US); Stephen P. Traynor, San Francisco, CA (US)

(73) Assignee: Federal Home Loan Bank of San Francisco, San Francisco, CA (US)

( * ) Notice: Subject to any disclaimer, the term of this patent is extended or adjusted under 35 U.S.C. 154(b) by 616 days.

(21) Appl. No.: 10/834,493

(22) Filed: Apr. 28, 2004

(51) Int. Cl.
*G06Q 40/00* (2006.01)

(52) U.S. Cl. ............................. 705/38; 705/35; 705/37; 705/39

(58) Field of Classification Search .................. 705/38, 705/35, 37, 39
See application file for complete search history.

(56) References Cited

U.S. PATENT DOCUMENTS 6,006,207 A * 12/1999 Mumick et al. ............... 705/38

2005/0027647 A1 * 2/2005 Bershteyn .................... 705/38

OTHER PUBLICATIONS

Lenders' prepayment penalties are unjust :[1 Edition]. Toronto Star [serial online]. Sep. 5, 1998:1. Available from: ProQuest Information and Learning, Ann Arbor, Mi. Document ID: 444452401.*
Mortgage discount is taxable Series: Tax Tips:[City Edition] Robert J. Bruss. St. Petersburg Times. St. Petersburg, Fla.:May 22, 1988. p. 19.*
Mortgage Prepayment Discount Received on Sale of Home was Or The Tax Adviser. New York: Apr. 1987. vol. 18, Iss. 4, p. 282 (3 pp.).*

* cited by examiner

*Primary Examiner*—Kambiz Abdi
*Assistant Examiner*—Shahid R Merchant
(74) *Attorney, Agent, or Firm*—Gard & Kaslow LLP (57) ABSTRACT

Disclosed are systems and methods of managing financial transactions such as the prepayments of loans. Various embodiments of the invention allow a lender to pay a prepayment credit to a borrower under certain conditions, and under other conditions for the borrower to pay a prepayment fee to the lender. Prepayment credits and fees may be calculated using various formulas that account for changes in a value of the debt and/or changes in financial conditions such as interest rates. Any prepayment fees may be subject to limitations configured to avoid settlement of debt for less than fair market value and to avoid undesirable accounting consequences associated with prepayment.

18 Claims, 10 Drawing Sheets

Example 1: Prepayment Fee

The borrower has a $25 million FRC PPS loan with an original term of five years that has two years remaining to maturity. Interest rates have dropped substantially and the current comparable rates for both the loan contract and the matched contract (used to approximate the Matched Contract Termination Cost) are lower. The borrower does not request a replacement loan.

Assumptions:

|  | Original | Remaining Term |
|---|---|---|
| Loan Contract Rate: | 3.50% | 1.50% |
| Cost of Funds: | 3L – 3 bps | 3L – 6 bps |
| Matched Contract Fixed Rate: | 3.43% | 1.46% |
| VTF Percentage (no replacement loan): |  | 10 bps |
| Discount Rate (PV calc. for cost of funds, VTF): |  | 1.40% |
| Discount Rate (PV calc. for Fair Value): |  | 1.50% |
| Matched Contract Termination Cost (Bank pays): |  | $968,278 |

Calculations:

| Standard Prepayment Formula Calculation | | | |
|---|---|---|---|
| | Components | Value in Bps | PV |
| | 1. Change in Cost of Funds: | | |
| | Cost of Funds designated on Trade Date: | 3L-3 bps | |
| *Minus* | Cost of Funds designated on Notice Date: | 3L-6 bps | |
| | | 3 bps | $14,766 |
| *Plus* | 2. Matched Contract Termination Cost: | | $968,278 |
| *Plus* | 3. VTF Percentage: | 10 bps | $49,222 |
| | Standard Prepayment Calculation Result: | | $1,032,267 |

310, 315, 320

| Change in Fair Value Calculation | | | |
|---|---|---|---|
| | Components | Value in Bps | PV |
| | Loan Contract Rate on Trade Date: | 3.50% | |
| *Minus* | Loan Contract Rate on Notice Date: | 1.50% | |
| | Change in Fair Value Calculation Result: | 200 bps | $983,334 |

325

| Final Prepayment Fee/Credit Calculation | |
|---|---|
| Prepayment Credit Cap Components | $ Amount |
| 1. Standard Prepayment Calculation Result: | $1,032,267 |
| 2. Change in Fair Value Calculation Result: | $983,334 |
| Greater of Components 1 & 2: | $1,032,267 |
| Prepayment Credit Cap (applicable only to prepay credits): | N/A |
| FINAL PREPAYMENT CALCULATION: | $1,032,267 FEE |

Example 2: Prepayment Credit

The borrower has a $25 million FRC PPS loan with an original term of five years that has two years remaining to maturity. Interest rates have increased substantially and the current comparable rates for both the loan contract and the matched contract (used to approximate the Matched Contract Termination Cost) are higher. The borrower does not request a replacement loan.

Assumptions:

|  | Original | Remaining Term |
|---|---|---|
| Loan Contract Rate: | 3.50% | 6.50% |
| Cost of Funds: | 3L – 3 bps | 3L – 6 bps |
| Matched Contract Fixed Rate: | 3.43% | 6.46% |
| VTF Percentage (no replacement loan): |  | 10 bps |
| Discount Rate (PV calc. for cost of funds, VTF): |  | 6.40% |
| Discount Rate (PV calc. for Fair Value): |  | 6.50% |
| Matched Contract Termination Cost (Bank receives): |  | -$1,411,269 |

Calculations:

Standard Prepayment Formula Calculation

| | Components | Value in Bps | PV |
|---|---|---|---|
| | 1. Change in Cost of Funds: | | |
| | Cost of Funds designated on Trade Date: | 3L-3 bps | |
| *Minus* | Cost of Funds designated on Notice Date: | 3L-6 bps | |
| | | 3 bps | $13,975 |
| *Plus* | 2. Matched Contract Termination Cost: | | -$1,411,269 |
| *Plus* | 3. VTF Percentage: | 10 bps | $46,584 |
| | Standard Prepayment Calculation Result: | | -$1,350,710 |

Change in Fair Value Calculation

| | Components | Value in Bps | PV |
|---|---|---|---|
| | Loan Contract Rate on Trade Date: | 3.50% | |
| *Minus* | Loan Contract Rate on Notice Date: | 6.50% | |
| | Change in Fair Value Calculation Result: | -300 bps | -$1,395,998 |

Final Prepayment Fee/Credit Calculation

| Prepayment Credit Cap Components | $ Amount |
|---|---|
| 1. Standard Prepayment Calculation Result: | -$1,350,710 |
| 2. Change in Fair Value Calculation Result: | -$1,395,398 |
| Greater of Components 1 & 2: | -$1,350,710 |
| | |
| Prepayment Credit Cap (applicable only to prepay credits): | |
| 1. 10% of Prepaid Par Amount: | $2,500,000 |
| 2. Absolute value of Matched Contract Termination Cost: | $1,411,269 |
| Lesser of Components 1 & 2: | $1,411,269 |
| | |
| FINAL PREPAYMENT CALCULATION: | $1,350,710 CREDIT |

Example 3: Prepayment Credit with Prepayment Cap Based on Matched Contract

The borrower has a $25 million FRC PPS loan with an original term of five years that has two years remaining to maturity. Interest rates have increased substantially and the current comparable rates for both the loan contract and the matched contract (used to approximate the Matched Contract Termination Cost) are higher. However, the swap rate has increased less than the corresponding loan rate. The borrower does not request a replacement loan.

Assumptions:

|  | Original | Remaining Term |
|---|---|---|
| Loan Contract Rate: | 3.50% | 6.50% |
| Cost of Funds: | 3L – 3 bps | 3L + 10 bps |
| Matched Contract Fixed Rate: | 3.43% | 6.30% |
| VTF Percentage (no replacement loan): |  | 10 bps |
| Discount Rate (PV calc. for cost of funds, VTF): |  | 6.40% |
| Discount Rate (PV calc. for Fair Value): |  | 6.50% |
| Matched Contract Termination Cost (Bank receives): |  | -$1,339,111 |

Calculations:

| Standard Prepayment Formula Calculation | | | |
|---|---|---|---|
| | Components | Value in Bps | PV |
| | 1. Change in Cost of Funds: | | |
| | Cost of Funds designated on Trade Date: | 3L-3 bps | |
| Minus | Cost of Funds designated on Notice Date: | 3L+10 bps | |
| | | -13 bps | -$60,559 |
| Plus | 2. Matched Contract Termination Cost: | | -$1,339,111 |
| Plus | 3. VTF Percentage: | 10 bps | $46,584 |
| | Standard Prepayment Calculation Result: | | -$1,353,086 |

| Change in Fair Value Calculation | | | |
|---|---|---|---|
| | Prepayment Credit Cap Components | Value in Bps | PV |
| | Loan Contract Rate on Trade Date: | 3.50% | |
| Minus | Loan Contract Rate on Notice Date: | 6.50% | |
| | Change in Fair Value Calculation Result: | -300 bps | -$1,395,998 |

| Final Prepayment Fee/Credit Calculation | |
|---|---|
| Components | $ Amount |
| 1. Standard Prepayment Calculation Result: | -$1,339,111 |
| 2. Change in Fair Value Calculation Result: | -$1,395,998 |
| Greater of Components 1 & 2: | -$1,336,369 |
| | |
| Prepayment Credit Cap (applicable only to prepay credits): | |
| 1. 10% of Prepaid Par Amount: | $2,500,000 |
| 2. Absolute value of Matched Contract Termination Cost: | $1,339,111 |
| Lesser of Components 1 & 2: | $1,339,111 |
| | |
| FINAL PREPAYMENT CALCULATION: | $1,339,111 CREDIT |

Example 4: Prepayment Credit is Zero

The borrower has a $25 million FRC PPS loan with an original The rate for a current comparable loan is higher, while the rate for a current comparable matched contract (used to approximate the Matched Contract Termination Cost) is slightly lower term of five years that has two years remaining to maturity.. The borrower does not request a replacement loan.

Assumptions:

|  | Original | Remaining Term |
|---|---|---|
| Loan Contract Rate: | 3.50% | 3.70% |
| Cost of Funds: | 3L – 3 bps | 3L + 10 bps |
| Matched Contract Fixed Rate: | 3.43% | 3.40% |
| VTF Percentage (no replacement loan): |  | 10 bps |
| Discount Rate (PV calc. for cost of funds, VTF): |  | 3.50% |
| Discount Rate (PV calc. for Fair Value): |  | 3.70% |
| Matched Contract Termination Cost (Bank pays): |  | $13,720 |

Calculations:

Standard Prepayment Formula Calculation

| Components | Value in Bps | PV |
|---|---|---|
| 1. Change in Cost of Funds: |  |  |
| Cost of Funds designated on Trade Date: | 3L - 3 bps |  |
| *Minus* Cost of Funds designated on Notice Date: | 3L + 10 bps |  |
|  | -13 bps | -$62,514 |
| *Plus* 2. Matched Contract Termination Cost: |  | $13,720 |
| *Plus* 3. VTF Percentage: | 10 bps | $48,087 |
| Standard Prepayment Calculation Result: |  | -$706 |

Change in Fair Value Calculation

| Components | Value in Bps | PV |
|---|---|---|
| Loan Contract Rate on Trade Date: | 3.50% |  |
| *Minus* Loan Contract Rate on Notice Date: | 3.70% |  |
| Change in Fair Value Calculation Result: | -20 bps | -$95,963 |

Final Prepayment Fee/Credit Calculation

| Components | $ Amount |
|---|---|
| 1. Standard Prepayment Calculation Result: | -$706 |
| 2. Change in Fair Value Calculation Result: | -$95,963 |
| Greater of Components 1 & 2: | -$706 |
| Prepayment Credit Cap (applicable only to prepay credits): | $0 |
| (Cap is $0 because Bank pays MC counterparty a positive sum) |  |
| FINAL PREPAYMENT CALCULATION: | $0 CREDIT |

Example 1: Prepayment Credit

The borrower has a $25 million ARC PPS loan that has an interest rate cap. The original term of the loan was five years and there are two years remaining to maturity. Interest rates have increased substantially and the interest rate cap now has a great deal of value. The borrower does not request a replacement loan.

Assumptions:

|  | Original | Remaining Term |
|---|---|---|
| Loan Contract Rate: | 3L + 79 bps | 3L + 953 bps |
| Cost of Funds: | 3L – 5 bps | 3L – 7 bps |
| VTF Percentage (no replacement loan): |  | 10 bps |
| Discount Rate (PV calc. for cost of funds, VTF): |  | 10.33% |
| Discount Rate (PV calc. for Fair Value): |  | 10.40% |
| Matched Contract Termination Cost (Bank receives): |  | -$2,500,000 |

Calculations:

| Standard Prepayment Formula Calculation | | | |
|---|---|---|---|
| | Components | Value in Bps | PV |
| | 1. Change in Cost of Funds: | | |
| | Cost of Funds designated on Trade Date: | 3L – 5 bps | |
| Minus | Cost of Funds designated on Notice Date: | 3L – 7 bps | |
| | | 2 bps | $8,931 |
| Plus | 2. Matched Contract Termination Cost: | | -$2,500,000 |
| Plus | 3. VTF Percentage: | 10 bps | $44,656 |
| | Standard Prepayment Calculation Result: | | -$2,446,413 |

| Change in Fair Value Calculation | | | |
|---|---|---|---|
| | Components | Value in Bps | PV |
| | Loan Contract Rate on Trade Date: | 3L + 79 bps | |
| Minus | Loan Contract Rate on Notice Date: | 3L + 953 bps | |
| | Change in Fair Value Calculation Result: | -874 bps | -$3,895,896 |

| Final Prepayment Fee/Credit Calculation | |
|---|---|
| Prepayment Credit Cap Components | $ Amount |
| 1. Standard Prepayment Calculation Result: | -$2,446,413 |
| 2. Change in Fair Value Calculation Result: | -$3,895,896 |
| Greater of Components 1 & 2: | -$2,446,413 |
| Prepayment Credit Cap (applicable only to prepay credits): | |
| 1. 10% of Prepaid Par Amount: | $2,500,000 |
| 2. Absolute value of Matched Contract Termination Cost | $2,500,000 |
| Lesser of Components 1 & 2: | $2,500,000 |
| FINAL PREPAYMENT CALCULATION: | $2,446,413 CREDIT |

Example 2: Prepayment Credit with Prepayment Credit Cap (10% limitation)
The borrower has a $25 million ARC PPS loan that has an interest rate cap. The original term of the loan was five years and there are two years remaining to maturity. Interest rates have increased substantially and the interest rate cap now has a great deal of value. The borrower does not request a replacement loan.

Assumptions:

|  | Original | Remaining Term |
|---|---|---|
| Loan Contract Rate: | 3L + 79 bps | 3L + 103 bps |
| Cost of Funds: | 3L – 5 bps | 3L – 7 bps |
| VTF Percentage (no replacement loan): |  | 10 bps |
| Discount Rate (PV calc. for cost of funds, VTF): |  | 10.30% |
| Discount Rate (PV calc. for Fair Value): |  | 10.40% |
| Matched Contract Termination Cost (Bank receives): |  | -$122,450 |

Calculations:

| Standard Prepayment Formula Calculation | | | |
|---|---|---|---|
| | Components | Value in Bps | PV |
| | 1. Change in Cost of Funds: | | |
| | Cost of Funds designated on Trade Date: | 3L - 5 bps | |
| *Minus* | Cost of Funds designated on Notice Date: | 3L - 7 bps | |
| | | 2 bps | $9,426 |
| *Plus* | 2. Matched Contract Termination Cost: | | -$122,450 |
| *Plus* | 3. VTF Percentage: | 10 bps | $47,130 |
| | Standard Prepayment Calculation Result: | | -$65,889 |

| Change in Fair Value Calculation | | | |
|---|---|---|---|
| | Components | Value in Bps | PV |
| | Loan Contract Rate on Trade Date: | 3L + 79 bps | |
| *Minus* | Loan Contract Rate on Notice Date: | 3L + 103 bps | |
| | Change in Fair Value Calculation Result: | -24 bps | -$112,903 |

| Final Prepayment Fee/Credit Calculation | |
|---|---|
| Prepayment Credit Cap Components | $ Amount |
| 1. Standard Prepayment Calculation Result: | -$65,889 |
| 2. Change in Fair Value Calculation Result: | -$112,903 |
| Greater of Components 1 & 2: | -$65,889 |
| Prepayment Credit Cap (applicable only to prepay credits): | |
| 1. 10% of Prepaid Par Amount: | $2,500,000 |
| 2. Absolute value of Matched Contract Termination Cost: | $122,450 |
| Lesser of Components 1 & 2: | $122,450 |
| FINAL PREPAYMENT CALCULATION: | $65,889 CREDIT |

Example: Prepayment Credit

The borrower has a $25 million Callable PPS loan with an original term of five years that has three years remaining to maturity and one year to the next call date. Interest rates have increased substantially. Because of the increase in rates, the call option is not likely to be exercised at the next call date and the expected remaining life of the loan is two years.

Assumptions:

|  | Original | Remaining Term |
|---|---|---|
| Loan Contract Rate: | 3.50% | 4.50% |
| Cost of Funds: | 3L – 15 bps | 3L – 18 bps |
| Discount Rate (PV calc. for cost of funds, 10 bps): |  | 4.33% |
| Discount Rate (PV calc. for Fair Value): |  | 4.50% |
| Matched Contract Termination Cost (Bank receives): |  | -$489,825 |

Calculations:

Standard Prepayment Formula Calculation

|  | Components | Value in Bps | PV |
|---|---|---|---|
|  | 1. Change in Cost of Funds: |  |  |
|  | Cost of Funds designated on Trade Date: | 3L-15 bps |  |
| *Minus* | Cost of Funds designated on Notice Date: | 3L-18 bps |  |
|  |  | 3 bps | $14,295 |
| *Plus* | 2. 10 bps per annum: | 10 bps | $47,650 |
| *Plus* | 3. Matched Contract Termination Cost: |  | -$489,825 |
|  | Standard Prepayment Calculation Result: |  | -$427,880 |

Change in Fair Value Calculation

|  | Components | Value in Bps | PV |
|---|---|---|---|
|  | Loan Contract Rate on Trade Date: | 3.50% |  |
| *Minus* | Loan Contract Rate on Notice Date: | 4.50% |  |
|  | Change in Fair Value Calculation Result: | -100 bps | -$475,608 |

Final Prepayment Fee/Credit Calculation

| Prepayment Credit Cap Components | $ Amount |
|---|---|
| 1. Standard Prepayment Calculation Result: | -$427,880 |
| 2. Change in Fair Value Calculation Result: | -$475,608 |
| Greater of Components 1 & 2: | -$427,880 |
| Prepayment Credit Cap (applicable only to prepay credits): |  |
| 1. 10% of Prepaid Par Amount: | $2,500,000 |
| 2. Absolute value of Matched Contract Termination Cost: | $489,825 |
| Lesser of Components 1 & 2: | $489,825 |
| FINAL PREPAYMENT CALCULATION: | $427,880 CREDIT |

Example: Prepayment Credit

The borrower has a $25 million Putable PPS loan with an original term of five years that has three years remaining to maturity and ten months to the next put date. Interest rates have increased substantially. Because of the increase in rates, the expected average remaining life of the loan is one year.

Assumptions:

|  | Original | Remaining Term |
|---|---|---|
| Loan Contract Rate: | 1.50% | 2.50% |
| Cost of Funds: | 3L – 15 bps | 3L – 18 bps |
| Discount Rate (PV calc. for cost of funds, 10 bps): |  | 2.33% |
| Discount Rate (PV calc. for Fair Value): |  | 2.50% |
| Matched Contract Termination Cost (Bank receives): |  | -$253,510 |

Calculations:

Standard Prepayment Formula Calculation

|  | Components | Value in Bps | PV |
|---|---|---|---|
|  | 1. Change in Cost of Funds: |  |  |
|  | Cost of Funds designated on Trade Date: | 3L-15 bps |  |
| *Minus* | Cost of Funds designated on Notice Date: | 3L-18 bps |  |
|  |  | 3 bps | $7,392 |
| *Plus* | 2. 10 bps per annum: | 10 bps | $24,640 |
| *Plus* | 3. Matched Contract Termination Cost: |  | -$253,510 |
|  | Standard Prepayment Calculation Result: |  | -$221,478 |

Change in Fair Value Calculation

|  | Components | Value in Bps | PV |
|---|---|---|---|
|  | Loan Contract Rate on Trade Date: | 1.50% |  |
| *Minus* | Loan Contract Rate on Notice Date: | 2.50% |  |
|  | Change in Fair Value Calculation Result: | -100 bps | -$246,142 |

Final Prepayment Fee/Credit Calculation

| Prepayment Credit Cap Components | $ Amount |
|---|---|
| 1. Standard Prepayment Calculation Result: | -$221,478 |
| 2. Change in Fair Value Calculation Result: | -$246,142 |
| Greater of Components 1 & 2: | -$221,478 |
| Prepayment Credit Cap (applicable only to prepay credits): |  |
| 1. 10% of Prepaid Par Amount: | $2,500,000 |
| 2. Absolute value of Matched Contract Termination Cost: | $253,510 |
| Lesser of Components 1 & 2: | 253,510 |
| FINAL PREPAYMENT CALCULATION: | $221,478 CREDIT |

SYSTEMS AND METHODS OF MANAGING PREPAYMENT

BACKGROUND

1. Field of the Invention

The invention is in the field of financial management and more specifically in the field of loan management.

2. Background Art

Lending is an integral part of modern financial markets. Loans are typically made under contact for fixed or variable interest rates. For example, a home loan may have a term of 30 years at a fixed interest rate. In this case, the loan represents a stream of payments to the lender and is thus an asset whose value is easily calculable and typically marketable on secondary markets. The value of this asset may change over time with changes in interest rates, interest rate volatility, or other factors. Thus, if interest rates rise the value of the loan to the party receiving payments may decline, and if interest rates fall the value of the loan to the party receiving payments may rise.

Historically, loan contracts have either allowed prepayment (of some or all of an outstanding loan balance) without a prepayment fee, or with a fee specified in a prepayment fee schedule. When the value of a loan has risen from the lender's perspective, prepayment is to the disadvantage of the lender. Prepayment fees are designed to compensate for this disadvantage, among other things. When the value of a loan has fallen prepayment is to the advantage of the lender because, presumably, the lender can then re-lend the prepaid funds at a higher interest rate, or otherwise benefit from making a new loan. Thus, prepayment under these conditions may be a benefit to the lender above what would normally be required to make the lender financially indifferent.

As interest rates and other financial variables change, the value of prepayments to the lender, change as well. However, the value of prepayments to the borrower does not change in the same manner. For example, if interest rates rise and a prepayment is made then the lender may receive a benefit. However, there are no mechanisms by which the borrower may share in this benefit. Barring outside factors, there is, therefore, little incentive within prior art loan contracts for the borrower to make prepayments under certain circumstances. This lack of symmetry in benefits (and harm) associated with prepayments represents an inefficiency in the financial markets.

Elimination of this inefficiency would be beneficial to both lenders and borrowers. Any solution, however, should fit within limitations imposed by accounting regulations.

SUMMARY

The invention includes systems and methods of managing prepayments. In various embodiments, these systems and methods are configured to improve the symmetry of benefit and harm associated with these prepayments, as experienced by lenders and borrowers. For example, various embodiments of the invention include methods of determining the value of a prepayment, and methods of using that value to determine a debit (e.g., fee) or credit (e.g., refund) to the borrower as a consequence of the prepayment. These systems and methods may allow a borrower to share in some benefits received by the lender when prepayments are made on loans.

Various embodiments of the invention include a loan or other payment contract configured such that the contract is not viewed as two separate financial instruments (e.g., an interest rate derivative and a loan) under applicable accounting practices.

Various embodiments of the invention include loan or other payment contracts configured such that credits to a borrower are never so great as to settle a loan for less than fair market value.

Various embodiments of the invention include a computing system comprising an input interface configured to receive prepayment information associated with a prepayment toward settlement of a loan from a payer, memory configured to store computer instructions, the computer instructions being for determining a prepayment credit to be credited to the payer in response to the prepayment, the prepayment credit being determined using a matched contract, a processor configured to execute the computer instructions, and an output interface configured to output the prepayment credit determined using the computer instructions.

Various embodiments of the invention include a method of managing a prepayment, the method comprising establishing a first contract for one or more future payments, determining a matched contract configured to approximate features of the first contract and to represent a value of the first contract, receiving a prepayment on the first contract, determining a value of the matched contract at a prepayment date, and using the determined value to calculate a prepayment credit or debit to a payer of the prepayment.

Various embodiments of the invention include a method of managing a prepayment, the method comprising receiving from a debtor prepayment toward settlement of all or part of a debt, determining a fraction of the debt settled by the prepayment, determining a fair market value of the fraction of the debt, determining a prepayment credit responsive to the determined fair market value and a previous fair market value of the debt, the prepayment minus the prepayment credit being greater than or equal to the determined fair market value, and providing the prepayment credit to the debtor.

Various embodiments of the invention include a method of managing a prepayment from a debtor, the method comprising receiving the prepayment toward settlement of all or part of a debt, the prepayment including prepaid principal of the debt, determining a prepayment credit responsive to the prepayment and a value of the fraction of the debt settled by the prepayment, and limiting the determined prepayment credit to a percentage of a par amount of the prepaid principal.

Various embodiments of the invention include a system configured for managing a prepayment from a debtor, the system comprising means for receiving the prepayment toward settlement of all or part of a debt, the prepayment including prepaid principal of the debt, means for determining a prepayment credit responsive to the prepayment and a value of the fraction of the debt settled by the prepayment, and means for limiting the determined prepayment credit to a percentage of a par amount of the prepaid principal.

Various embodiments of the invention include a loan contract comprising a term specifying a loan amount, a term specifying one or more future payments, a term specifying a matched contract configured to approximate features of the loan contract and to represent a value specified by the loan contract, and a term specifying that a value of the matched contract at a prepayment date be used to calculate a prepayment credit or fee to a payer of the prepayment.

These and other features, aspects and advantages of the present invention will become better understood with reference to the following description and appended claims.

BRIEF DESCRIPTION OF THE VARIOUS VIEWS OF THE DRAWINGS

FIGS. 3A-3H illustrate specific examples of calculations performed according to various embodiments of the invention.

DETAILED DESCRIPTION OF THE INVENTION

The invention includes new methods and systems associated with managing prepayments, such as those that may be received in association with a loan. These systems and methods may allow a payer of prepayments to participate in the financial benefit or harm of the prepayment to a payee. By enabling this participation, various embodiments of the invention allow for more efficient financial transactions.

Various embodiments of the invention include a method of determining the benefit of a prepayment to the payee and calculating a part of that benefit that may be shared with the payer. The benefit or harm of a prepayment may be determined using a matched contract that is configured to approximate the value and/or certain other financial characteristics of the loan on which the prepayment is paid. For example, this matched contract may be a financial derivative having features similar to the loan. The part of any benefit that can be shared with the payer is a prepayment credit that may be returned to the payer. Prepayment credits may be calculated to conform to restrictions imposed by financial considerations and by customary accounting standards. For example, some embodiments of the invention include limits on prepayment credits, configured so that the payee does not experience a net loss from the prepayment, according to applicable accounting standards. Further, some embodiments of the invention include limits on prepayment credits configured to avoid bifurcation of a debt or investment, according to applicable accounting rules.

The invention may be in embodied in a financial agreement (e.g., a loan contract), a computer program configured to make calculations relating to a prepayment, a prepayment credit, a system for managing a prepayment, a method of calculating the fair value of a prepayment, a method of determining a prepayment credit, computer readable media, a carrier signal, or the like.

Figure 1:
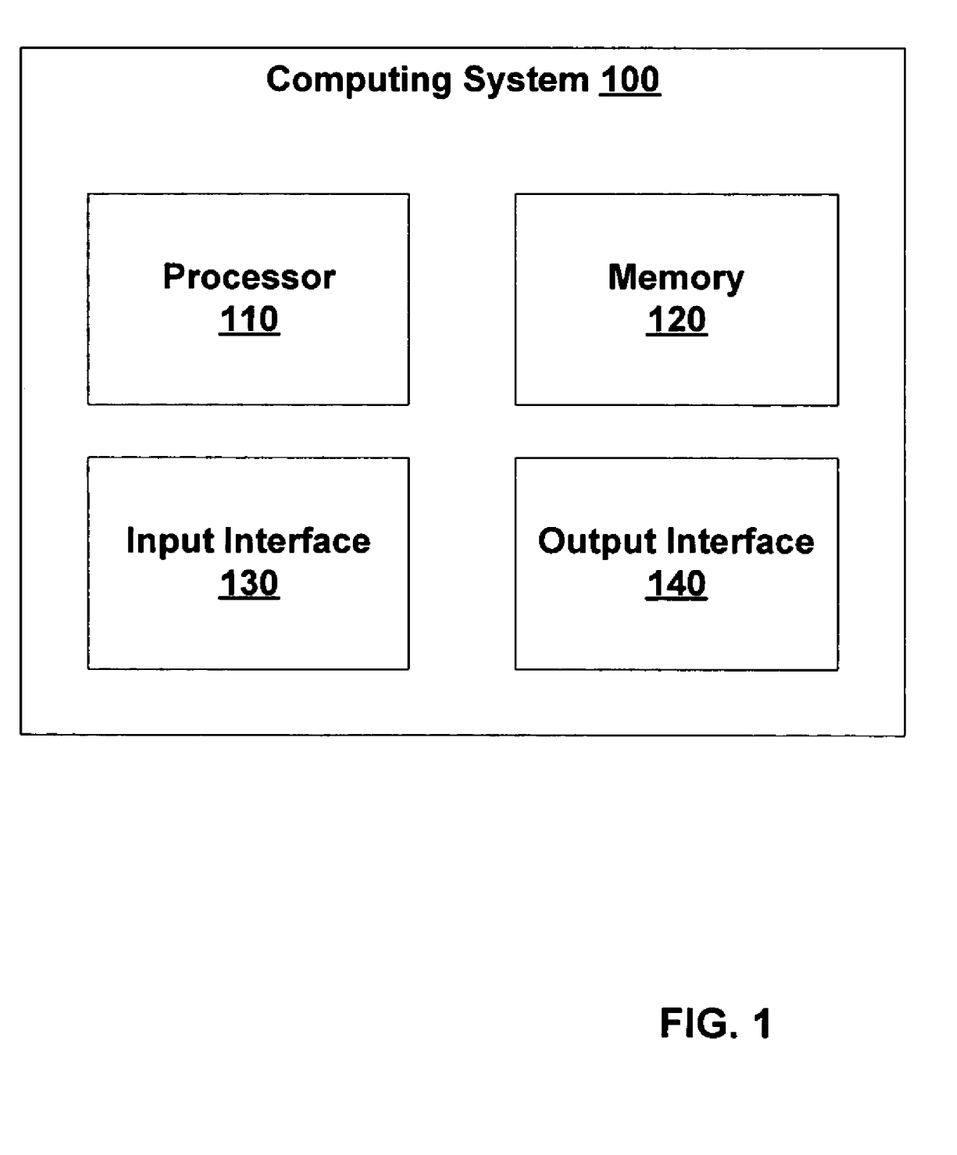
FIG. 1 illustrates a computing system, according to various embodiments of the invention.

FIG. 1 illustrates a Computing System 100, according to various embodiments of the invention. Computing System 100 includes a Processor 110, Memory 120, an Input Interface 130 and an Output Interface 140. Processor 110 is configured to execute computer code stored in Memory 120, to control Input Interface 130, and to control Output Interface 140. Computing System 100 may be a single computing device or a distributed system. Further characteristics of Computing System 100 are described elsewhere herein. In particular, further details regarding Processor 110, Memory 120, Input Interface 130 and Output Interface 140 are characterized with reference to methods of the invention.

Figure 2:
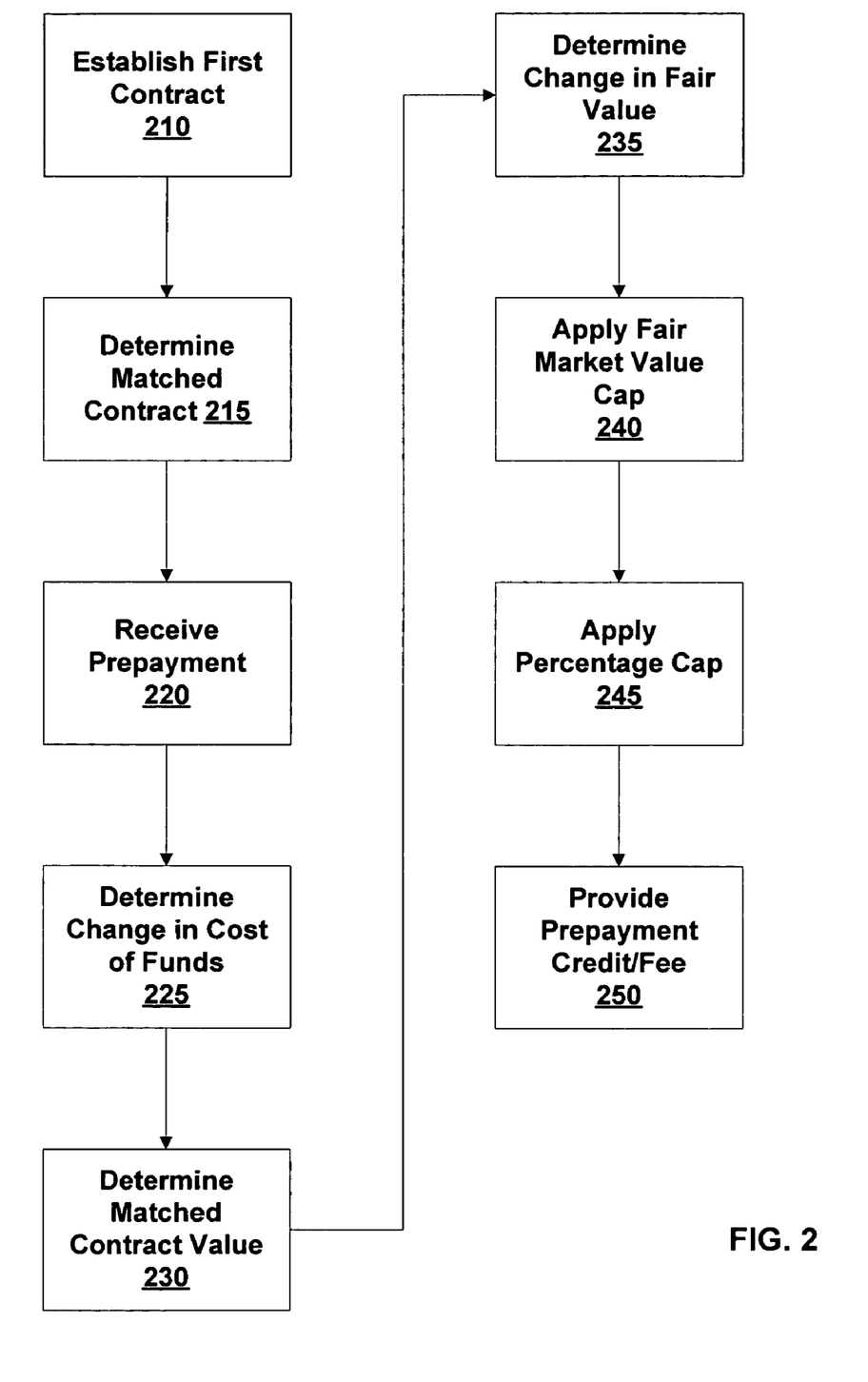
FIG. 2 illustrates a method of managing a prepayment, according to various embodiments of the invention.

FIG. 2 illustrates a method of managing a prepayment, according to various embodiments of the invention. This method may be performed using the Processor 110, Memory 120, Input Interface 130 and Output Interface 140 of FIG. 1.

In an Establish First Contract Step 210 a first contract is established between two parties (e.g., a lender and a borrower). This first contract includes a promise to make future payments between the parties. For example, in a typical embodiment the contract is a loan agreement and the borrower agrees to repay the loan to the lender in one or more scheduled payments. With regard to these payments the borrower is the payer and the lender is the payee. In various embodiments, the first contract includes terms associated with some or all of Determine Matched Contract Step 215 through Provide Prepayment Credit/Fee Step 250. The first contract is optionally generated using computer instructions stored in Memory 120 under the control of Processor 110, and produced as printed or electronic output of Computing System 100 using Output Interface 140.

The first contract includes one or more terms specifying calculations that may be associated with a prepayment (e.g., a payment made before its scheduled due date.). These calculations optionally provide a possibility that the payer will receive a prepayment credit or be charged a fee upon making a prepayment. In various embodiments, the calculations include a change in cost of funds calculation, a matched contract termination cost calculation, a change in fair value calculation, and/or a prepayment credit cap calculation. These calculations are described further herein and may be performed using computer instructions stored in Memory 120.

In an optional Determine Matched Contract Step 215 a matched contract is determined and initially valued. The matched contract is configured to approximate characteristics of the first contract such that there is a correlation between their fair market values over time and with changes in interest rate conditions. For example, the matched contract may include an interest rate cap configured to match an interest rate cap of the first contract. In some embodiments, the lender may actually enter into the matched contract with a third party and, thus, establish the initial value of the matched contract through a financial market transaction. In some embodiments, the lender may establish a value of the matched contract based on financial markets without actually entering into the matched contract. In these embodiments the matched contract may be a theoretical construct modeled using Processor 110. Specifics of the matched contract are typically included in the first contract and are optionally stored in Memory 120. Thus, the matched contract may be valued at the time both parties commit to the loan contract, at the time first contract is executed or at the time loan proceeds are advanced to the borrower. As described further herein, the matched contract and its initial value may be used for determining a change in value of the first contract at a later time. Requirements for the first contract may be received using Input Interface 130 and the first contract may be provided to a user in printed or electronic form using Output Interface 140.

In a Receive Prepayment Step 220 the lender receives a commitment from a borrower to make a prepayment toward settlement of all or part of the loan from the borrower. The prepayment may result in a prepayment credit or fee, as calculated using Computing System 100, responsive to terms of the first contract and prevailing financial markets at the time of the prepayment. The amount of the prepayment credit or fee is determined using one or more of: a Determine Change in Cost of Funds Step 225, a Determine Matched Contract Value Step 230, a Determine Change in Fair Value Step 235, an Apply Fair Market Value Cap Step 240, and/or an Apply Percentage Cap Step 245, as described further herein.

In optional Determine Change in Cost of Funds Step 225 the change in cost of funds associated with the prepayment is determined. The funds associated with the prepayment are typically equivalent to the fraction of the total amount of the loan that is settled by the prepayment. The cost of this fraction is determined by multiplying their amount by relevant interest rates. For example, if the applicable interest rates have risen between these times then the cost of funds has typically risen as well. This added cost may be used to adjust any credit or fee associated with the prepayment. In one embodiment, the cost of funds at any particular time is determined as the then present value of expected cash flows at each future scheduled payment date up to and including the scheduled maturity date of the loan (or the expected average life of a loan with putable or callable features). The present value may be calculated by multiplying the prepaid principal amount by the difference between the cost of funds designated on the date the loan is advanced (or the date both parties commitment to the loan) and the cost of funds on the date the borrower commits to the prepayment. The cost of funds on the date prepayment is made is for a hypothetical cost of funds for a new loan with the same remaining characteristics as the loan being prepaid. The hypothetical cost of funds may be calculated using Processor 110 and data received through Input Interface 130. Methods for the determination of costs of funds and present values, generally, are well known in the art.

In optional Determine Matched Contract Value Step 230 the value, at the time of the prepayment, of the matched contract (of Determine Matched Contract Step 215) is determined. If the matched contract was actually entered into by the lender this value may include consideration of actual termination expenses. If the prepayment represents settlement of a part of the loan, the determined matched contract value is prorated to reflect the matched contract value associated with this part. Typically, the value of the matched contract is based on a fair market value of the matched contract. In some cases the value is determined by actual sale of the matched contract in a financial marketplace (e.g., a positive amount paid by the lender to a third party, or a negative amount received by the lender from the third party, plus transaction fees, overhead, or the like). In these cases, the value is provided to Computing System 100 through Input Interface 130.

The difference in values of the matched contract as determined in Step 215 and in Step 230 defines a change in the matched contract value. This change in matched contract value is combined with the change in cost of funds, as determined in Determine Change in Cost of Funds Step 225 to calculate a prepayment fee or a maximum prepayment credit to the payer. In some embodiments, the calculated prepayment fee or maximum prepayment credit is further adjusted using fees determinable before the prepayment is made. As described further herein, any prepayment credit is optionally subject to one or more prepayment credit caps. In some embodiments, the prepayment fee or prepayment credit is adjusted using a transaction fee (VTF) whose value may be calculated using a fixed or variable interest rate, or the like. For example, in some embodiments, the loan agreement specifies an additional ten basis points fee in order to cover overhead, lost profitability, miscellaneous costs, and the like.

In an optional Determine Change in Fair Value Step 235 the change in fair market value of the fraction of the loan settled by the prepayment is determined. This fair market value is typically determined responsive to current interest rate factors and market conditions. In some embodiments, the change in fair value is determined by subtracting the fair value of the fraction settled at the time of the prepayment was made, from a fair market value of the fraction at the time the loan was first advanced. The fair market value at the time of the prepayment may be calculated by multiplying the prepaid principal amount outstanding at each future scheduled payment date through the scheduled maturity date of the loan (or the expected average life of a loan having putable or callable features) by the difference between the loan contract rate designated on the date the loan fraction was first committed to by the parties (the commitment date) and the loan contract rate designated at the time the borrower committed to the prepayment (the prepayment date). The loan contract rate at the prepayment date is typically the rate for a new loan with the same remaining characteristics as the loan being prepaid.

In an optional Apply Fair Market Value Cap Step 240 the change in fair value determined in Determine Change in Fair Value Step 235 is used as a cap to limit any prepayment credit. Thus, the prepayment credit is limited to the change in fair value of the loan fraction prepaid or less. In various embodiments, Apply Fair Market Value Cap Step 240 is configured so that the lender does not experience a net loss, under applicable accounting standards, on the prepaid loan fraction by providing a prepayment credit.

In optional Apply Percentage Cap 245 any prepayment credit is limited to being no more that a fixed percentage of the prepaid fraction of the loan (e.g., the debt principal settled by the prepayment). The fixed percentage is selected responsive to accounting rules and interpretations that govern when loan agreements must be bifurcated (for accounting considerations) into separate option and loan instruments. The fixed percentage is selected so that the prepayment and/or prepayment credit is not required to be treated as a transaction relating to an option, according to applicable accounting standards. For example, in some embodiments, Apply Prepayment Credit Cap 245 includes limiting the prepayment credit to 10% of the prepaid fraction of the loan. In various alternative embodiments, the fixed percentage is a percentage equal to or less than, for example, 100%, 15%, 10%, or 7%. The fixed percentage is optionally stored in Memory 120.

In an optional Provide Prepayment Credit/Fee Step 250 any prepayment credit or prepayment fee is provided or charged to the payer, respectively. Thus, if the change in matched contract value combined with the change in cost of funds, and any other fees, result in a prepayment credit, then payer may receive a credit from the lender in response to a prepayment. In instances wherein a prepayment fee is charged to the payer, the prepayment fee may have been reduced from what would otherwise be due, by consideration of any change in matched contract value and/or consideration of any change in cost of funds. Any prepayment credit is optionally paid to the payer of the prepayment through Output Interface 140 as a check, an electronic funds transfer, a digitally encoded carrier wave, or the like. In various embodiments, Receive Prepayment Step 220 may occur at any time between Establish First Contract Step 210 and Provide Prepayment Credit/Fee Step 250.

All methods of the invention include at least one of Determine Matched Contract Value Step 230, Apply Fair Market Value Cap 240, or Apply Percentage Cap 245.

FIGS. 3A-3B illustrate specific examples of calculations performed according to various embodiments of the invention. These examples include both fixed rate loans, referred to as FRC PPS loans (fixed rate credit partial prepayment symmetry), and adjustable rate loans, referred to as ARC PPS loans (adjustable rate credit partial payment symmetry).

FIG. 3A illustrates an example calculation resulting in a Prepayment Fee 340. The lines designated 310 are an example of Determine Change in Cost of Funds Step 225. In these lines the cost of funds designated on a notice date (e.g., the prepayment date) is subtracted from the cost of funds designated on a trade date (e.g., the commitment date).

The line designated 315 illustrates an example of a result of Determine Matched Contract Value Step 230. In this example, the cost of terminating the matched contract was determined to be $968,278. This cost of terminating the matched contract is added to a VTF (transaction fee) in the line designated 320. A fixed VTF percentage of 10 basis points is included in the example of FIG. 3A. The result of this addition is a prepayment fee or a maximum prepayment credit to the payer. In the example shown, the addition results in a standard prepayment fee calculation result of $1,032,267.

The lines designated 325 illustrate an example of Determine Change in Fair Value Step 235. In these lines a loan contract rate on the notice date (e.g., the prepayment date) is subtracted from a loan contract rate on the trade date (e.g., the commitment date). The difference is shown in "bps" or basis points.

The lines designated 330 illustrate an example of Apply Fair Market Value Cap Step 240. In these steps, the greater of the standard prepayment calculation results ($1,032,267) and change in fair value calculation result ($983,334), as determined in the lines above, is selected as the prepayment credit or fee. In the example shown the standard prepayment calculation result is greater and thus becomes the final prepayment fee shown in the line designated 340. This comparison assures that the prepayment fee will not be less than the change in fair value of the prepaid funds.

FIG. 3B illustrates an example calculation resulting in a Prepayment Credit 350. Because the calculation results in a prepayment credit, a prepayment credit cap is applied in the lines designated 345. In this case, the prepayment credit is reduced to the lesser of 10% of the prepaid par amount or the absolute value of the matched contract termination cost. These lines correspond to an example of Apply Percentage Cap Step 245.

FIGS. 3C-3H illustrate further examples of calculations according to various embodiments of the invention. These calculations are typically performed using Computing System 100 and result in various prepayments credits and fees designated 355, 360, 365, 370, 375 and 380. Each figure illustrates calculations performed using a different set of starting assumptions. In some embodiments of the inventions, calculation statements such as those illustrated in FIGS. 3A-3H are optionally generated using computer instructions stored in Memory 120 under the control of Processor 110, produced as printed or electronic output of Computing System 100 using Output Interface 140, and/or provided to borrowers in association with a prepayment.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. For example, it is anticipated that the teaching herein may be applied to a scheduled payment other than one associated with a loan (e.g., a scheduled payment associated with a purchase contract or payment for a continuing service). It is also anticipated that the teaching herein may be adapted to management of payments made after rather than before their scheduled due date. It is also anticipated that the teachings herein may be adapted to modification of previously existing loan contracts. It is also anticipated that calculations taught herein may be adjusted pro rata for a specific interest rate accrual methodology as specified in a loan. It is anticipated that, in some embodiments, a matched contract may included limitations on termination value. For example, a matched contract may specify that a party to the matched contract may pay no more than a fixed percentage of the notional amount of the matched contract on partial or total termination. Hence, these descriptions and drawings should not be considered in a limiting sense, as it is understood that the present invention is in no way limited to only the embodiments illustrated.

We claim:

1. A computing system comprising:
   an input interface configured to receive information associated with a prepayment toward settlement of an original loan from a payer after the prepayment has been made;
   memory configured to store computer instructions, the computer instructions being for comparing the original loan to a matched third party financial derivative contract;
   a processor configured to execute the computer instructions; and
   an output interface configured to output a prepayment credit if the value of the loan has decreased when compared to the third party financial derivative contract or an additional amount due if the value of the loan has increased when compared to the third party financial derivative contract, the prepayment credit or additional amount due determined using the computer instructions.

2. The computing system of claim 1, wherein the prepayment is a payment to settle a loan and the matched contract is configured to approximate certain financial characteristics of the loan.

3. The computing system of claim 1, wherein the matched contract is a theoretical construct.

4. The computing system of claim 1, wherein the matched contract is an actual contract entered into with a third party.

5. The computing system of claim 1, wherein the prepayment credit is further determined using a change in fair value of a fraction of a debt settled by the prepayment.

6. The computing system of claim 1, wherein the prepayment credit is further determined using a prepayment credit cap.

7. The computing system of claim 1, wherein the prepayment credit is further determined using a prepayment credit cap of a fixed percent of an amount of principal prepaid by the prepayment.

8. The computing system of claim 1, wherein the prepayment credit is limited by a prepayment credit cap, the prepayment credit cap limiting the prepayment to a percentage of an amount of debt principal settled by the prepayment, such that the loan is not bifurcated into two separate financial instruments as determined by applicable accounting standards.

9. A method of managing a prepayment on an original loan by a debtor, the method comprising:
   receiving the prepayment toward settlement of all or a portion of the loan, the prepayment including prepaid principal;
   comparing by a computer processor the original loan to a matched third party financial derivative contract after the prepayment has been made;
   if the value of the original loan has decreased when compared to the third party financial derivative contract, providing the debtor with a credit for settling the portion of the loan represented by the prepayment based on the comparison; and if the value of the original loan has increased when compared to the third party financial derivative contract, charging the debtor an additional amount for settling the portion of the loan represented by the prepayment based on the comparison.

10. The method of claim 9, further comprising, if the value of the original loan has decreased, limiting the credit to the debtor to a percentage of a par amount of the prepaid principal.

11. The method of claim 9, wherein the value of the fraction of the debt settled is approximately a fair market value.

12. The method of claim 9, wherein the value of the fraction of the debt settled is approximately a par value.

13. The method of claim 10, wherein the percentage is less than or equal to 10 percent.

14. The method of claim 10, wherein the percentage is less than or equal to 15 percent.

15. The method of claim 10, wherein the percentage is less than or equal to 7 percent.

16. The method of claim 10, wherein the percentage conforms to accounting rules such that the prepayment is not considered a payment on an interest rate derivative.

17. The method of claim 10, wherein the percentage is configured to avoid bifurcation of the debt, according to applicable accounting rules.

18. A system configured for managing a prepayment from a debtor, the system comprising:
    means for recording the prepayment toward settlement of all or a portion of an original debt, the prepayment including prepaid principal of the debt;
    a processor for comparing the original debt to a matched third party financial derivative contract after the prepayment has been made;
    means for providing the debtor with a credit for settling the portion of the debt represented by the prepayment if the value of the debt has decreased when compared to the third party financial derivative contract, the credit limited to a percentage of a par amount of the prepaid principal, and charging the debtor an additional amount to settle the portion of the debt represented by the prepayment if the value of the loan has increased when compared to the third party financial derivative contract.

* * * * *